Sept. 2, 1930.  L. B. HUNTINGTON  1,774,976
ARTIFICIAL BAIT
Filed March 24, 1928
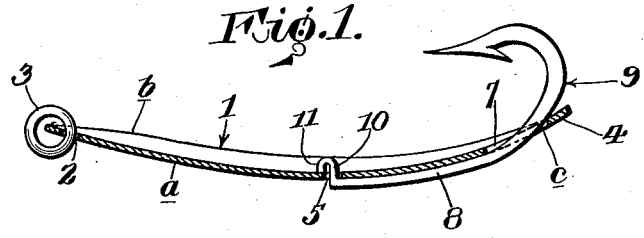
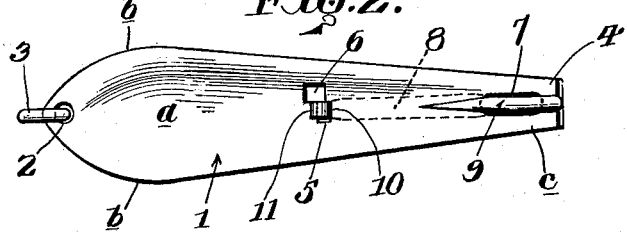
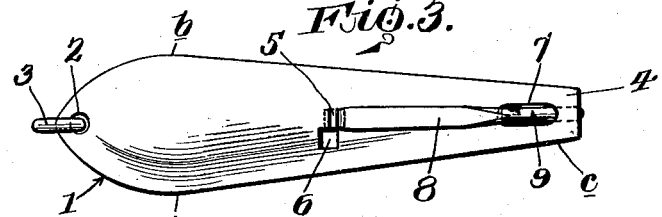
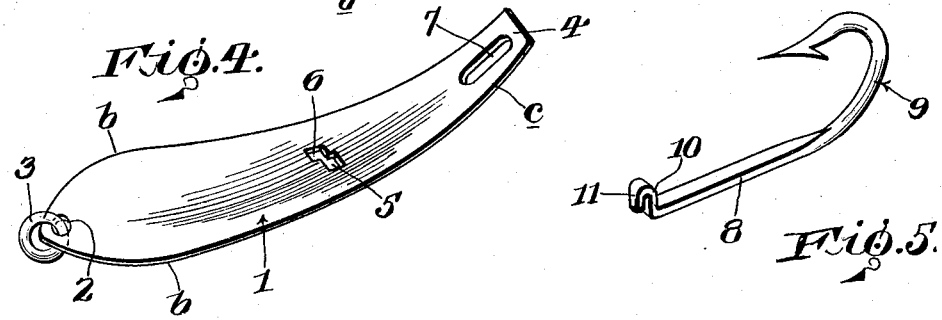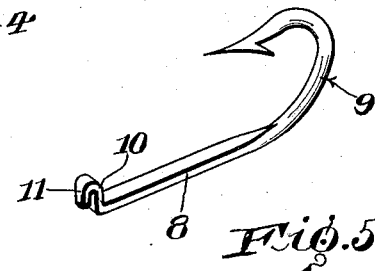
INVENTOR
Levin B. Huntington,
BY
Geo. P. Kimmel
ATTORNEY.

Patented Sept. 2, 1930

1,774,976

UNITED STATES PATENT OFFICE

LEVIN B. HUNTINGTON, OF ANNAPOLIS, MARYLAND

ARTIFICIAL BAIT

Application filed March 24, 1928. Serial No. 264,364.

This invention relates to artificial fish baits or lures and more particularly to an improvement upon the type of such device as disclosed in Letters Patent No. 1,460,905, granted to me on July 3, 1923, and not only embodies the objects and advantages present in the device disclosed by the aforementioned patent, but provides a device of this character wherein the hook may be readily attached to, or detached from the spoon, thereby permitting the replacement of the hook or spoon should either one of same be broken or damaged.

Another object of the invention is to provide, in a manner as hereinafter set forth, a device of the aforementioned character wherein hooks of different sizes and types may be used with the same spoon.

A further object of the invention is to provide such a device which is simple in construction, efficient in its use, and which may be manufactured at low cost.

Other objects and advantages of the invention will be apparent from a study of the following specification, taken in connection with the accompanying drawings in which like reference characters designate corresponding parts throughout the several views.

In the drawings:

Figure 1 is a longitudinal section of an artificial bait in accordance with this invention.

Figure 2 is a top plan view of the same.

Figure 3 is a bottom plan view.

Figure 4 is a perspective view of the spoon.

Figure 5 is a perspective view of the preferred form of hook to be attached to the spoon.

Referring to the drawings, 1 designates the body portion of a lure or bait spoon, preferably of sheet metal having an opening 2 at its forward end for the passage of a ring 3 for the purpose of attaching a fishing line thereto. The spoon 1 has the general outline of the handle portion of a table spoon and is otherwise concavo-convex in form with the greatest depth of the concavity slightly inward from the forward end of the same, as at $a$, and gradually lessening in depth rearwardly of the body to the end of the tail portion 4, where the curvature is practically nil. The opposite side edges of the body are tapered inwardly from the point $b$ to the rear end of the tail portion 4. The longitudinal curvature of the body rearwardly from the greatest depth $a$ of the concavity therein diminishes with an increasing rapidity to its point of connection $c$ with the tail portion 4, while the transverse curvature of the concaved side of the body decreases more gradually from the point of greatest depth $a$ thereof, and practically disappears, or nearly so, at the end of the tail portion 4.

The spoon is provided, at its longitudinal center and intermediate its ends, with an opening 5, preferably of polygonal contour. At one side of the longitudinal center of the spoon it is also provided with an opening 6, preferably of polygonal contour, which extends forwardly of the opening 5 and is of greater length than the latter. The openings 5 and 6 communicate with the other at the inner sides thereof, the arrangement being the cutting away of the rear part of the inner side wall of opening 6 and the forward part of the inner side wall of opening 5, under such conditions the remaining part of the inner side wall of opening 6 will project forwardly of the forward end wall of opening 5, and the remaining portion of the inner side wall of opening 5 will extend rearwardly from the rear end wall of opening 6 and provide an abutment for a purpose to be presently referred to.

The spoon is also provided, medially of the portion $c$ with a longitudinally extending slot or opening 7 of sufficient width to permit the passage of the shank 8 of a flexible spring hook 9 which is curved in a forward direction over the outer surface of the rearwardly tapering curved portion of the spoon 1, and rests under tension on the longitudinal center thereof when said hook is secured on the spoon. At a point forwardly of the curved portion of the hook 9, the shank 8 is flattened, said flattened portion terminating at its forward end in a right angularly disposed protuberance 10 having a tapered turned back nose 11 of less length than protuberance 10. The protuberance 10 and nose 11 comprise latching means adapted to engage the spoon for the purpose of securing the hook thereon, The manner of mounting the hook on the spoon is as follows:

The protuberance 10 and nose 11 of the hook are manipulated through the slot 7, and the shank 8 is slid therethrough until the flat portion of same has passed through said slot. The shank 8 is then directed forwardly in such manner that the parts 10 and 11 register with the opening 6 in the spoon. Pressure is then exerted upon the forward end of the shank 8 for the purpose of flexing same and projecting the latching means upwardly through the opening 6 until the free end of the nose 11 is in a plane above the adjacent upper surface of the spoon. Still maintaining the upward pressure thereon, the end of the shank 8 is then slid laterally on the spoon toward the opening 5 until the protuberance 10 has passed completely thereinto through the passage formed between the openings 5 and 6 at their point of mergence. The pressure is then removed from the shank 8, whereupon same will tend to spring outwardly toward its normal straight position but the free end of the nose 11 will then engage the upper surface of the spoon 1 and limit such outward movement. The hook 9 is then slid rearwardly relative to the spoon, which will cause the protuberance 10 to seat in the rear end of the opening 5 where any lateral movement of said hook will be prevented by the side walls of said opening as the remaining part of the inner side wall of opening 5 coacts with the other side wall of the latter to provide abutments for the edges of the protuberance 10. As the nose 11 remains seated against the upper face of the spoon 1 whereby the broad, flat face of the shank 8 is held tightly against the lower side of the spoon, thus preventing the hook from turning on said spoon.

It is thought that the many advantages of an artificial bait constructed in accordance with this invention will be readily understood, and, although the preferred embodiment of the invention is as illustrated and described, it is to be understood that changes in the details of construction may be made which will fall within the scope of the appended claims.

What I claim is:

1. An artificial bait comprising a body portion having a slot near one end for the passage of a hook, said body portion being further provided at a point forwardly of said slot, with a pair of communicating openings for the passage of the hook, one of said openings extending forwardly of the other, a hook having a shank extending through said slot, and means carried by the free end of the shank for latching the hook on the body portion, said means comprising an angularly disposed protuberance adapted to project through one of the communicating openings and having a turned back nose of less length than said protuberance for engaging one face of the body portion.

2. An artificial bait comprising a body portion having a slot at one end and further provided, at a point forwardly of said end with a pair of openings communicating with each other at the inner sides thereof for a portion of their length, one of said openings extending forwardly of the other, and a hook having its shank extending through said slot and positioned against the lower face of said body portion, said shank having an integral protuberance at its free end provided with a nose, said protuberance and nose for passage upwardly through said extended opening and laterally into and rearwardly in the other of said openings, the said nose seating against the upper face of said body portion and the side walls of the last mentioned opening coacting with said nose to prevent lateral shift of the shank and for latching the hook to the body portion.

3. An artificial bait comprising a body portion having a slot in proximity to its rear end and further provided, at a point forwardly of said end with a pair of openings communicating with each other at the inner sides thereof for a portion of their length, one of said openings extended forwardly of the other and arranged out of alignment with said slot, and a hook having a flat shank, said shank extending through said slot and positioned against the lower face of said body portion, said shank formed at its free end with an angularly disposed protuberance provided with a nose, said protuberance for extension upwardly through said extended opening and laterally into and rearwardly in the other of said openings whereby said nose will engage the upper face of said body portion, the side walls of said last mentioned opening coacting with said nose to prevent lateral shift of the shank and further to provide for the latching of the hook to the body portion.

4. An artificial bait comprising a body portion having a slot in proximity to its rear end and further provided, at a point forwardly of said end with a pair of polygonal shaped openings communicating with each other at the inner sdies thereof for a portion of their length, one of said openings extending forwardly of the other and arranged out of alignment with respect to said slot, and a hook having its shank extended through said slot and positioned against the lower face of said body portion, said shank having an integral protuberance having its free end provided with a nose, said protuberance arranged in the rear opening and coacting with the side walls thereof to prevent lateral shift of the hooks, said nose coacting with the upper face of said body portion for latching the hook to said body portion when the protuberance is extended in the rear of said rear opening, said forward opening providing for the passage of the protuberance for entrance into said rear opening.

In testimony whereof, I affix my signature hereto.

LEVIN B. HUNTINGTON.